(12) United States Patent
Robertson et al.

(10) Patent No.: US 10,293,948 B2
(45) Date of Patent: May 21, 2019

(54) DISTRIBUTED PARACHUTE SYSTEM

(71) Applicant: Kitty Hawk Corporation, Mountain View, CA (US)

(72) Inventors: Cameron Robertson, San Mateo, CA (US); Damon Vander Lind, Oakland, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 405 days.

(21) Appl. No.: 15/338,090

(22) Filed: Oct. 28, 2016

(65) Prior Publication Data

US 2018/0118354 A1     May 3, 2018

(51) Int. Cl.
*B64D 17/80*     (2006.01)
*B64D 17/62*     (2006.01)

(52) U.S. Cl.
CPC ............. *B64D 17/80* (2013.01); *B64D 17/62* (2013.01)

(58) Field of Classification Search
CPC ................................ B64D 17/80; B64D 17/62
See application file for complete search history.

(56) References Cited

U.S. PATENT DOCUMENTS

| | | | |
|---|---|---|---|
| 3,051,420 A | 8/1962 | Novak | |
| 3,315,920 A * | 4/1967 | Caughron | B64D 25/12 244/139 |
| 4,108,402 A * | 8/1978 | Bowen | B64D 17/80 244/102 R |
| 4,480,807 A * | 11/1984 | Bowen | B64D 17/80 244/139 |
| 4,496,122 A * | 1/1985 | Whipple | B64D 17/80 244/139 |
| 5,009,374 A * | 4/1991 | Manfredi | B64C 1/32 102/378 |
| 5,826,827 A * | 10/1998 | Coyaso | B64D 17/80 244/139 |
| 5,836,544 A * | 11/1998 | Gentile | B64C 27/006 244/17.17 |
| 5,899,414 A * | 5/1999 | Duffoo | B64D 17/80 169/60 |
| 5,921,503 A * | 7/1999 | Tsay | B64D 25/00 244/139 |
| 6,199,799 B1 * | 3/2001 | Lai | B64C 27/006 244/139 |
| 8,074,919 B1 * | 12/2011 | Kulesha | B64C 27/006 244/139 |
| 2008/0142635 A1 * | 6/2008 | Manfredi | B64D 25/00 244/1 R |

* cited by examiner

*Primary Examiner* — Valentina Xavier
(74) *Attorney, Agent, or Firm* — Van Pelt, Yi & James LLP

(57) ABSTRACT

A distributed parachute system is disclosed. In various embodiments, a parachute is at least partially deployed along one or more dimensions. A deployment mechanism configured to deploy the parachute is provided. The distributed parachute system is configured to be deployed in an aircraft that comprises a channel oriented along the one or more dimensions

18 Claims, 12 Drawing Sheets

DISTRIBUTED PARACHUTE SYSTEM

BACKGROUND OF THE INVENTION

The time between when an emergency occurs and when an aircraft is fully caught by a parachute is critical. The parachute may not fully inflate immediately or quickly. The parachute may not slow the aircraft enough to prevent the aircraft from being damaged upon landing.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distributed parachute system is disclosed. The system comprises a parachute at least partially deployed along one or more dimensions and a deployment mechanism configured to deploy the parachute. The distributed parachute system is configured to be deployed in an aircraft that comprises a channel oriented along the one or more dimensions. A portion of the aircraft may be removed or altered during parachute deployment.

A parachute in a distributed parachute system may be stored in a less compact manner than in traditional systems. Storing the parachute in a distributed fashion may allow the parachute to unfurl and inflate quickly, decreasing aircraft recovery time. A shape or configuration of an aircraft may determine how many parachutes are used, storage location of the one or more parachutes, or a method of parachute deployment. Multiple parachutes or multiple channels may be present in the system. In some embodiments, rockets or explosives are utilized to remove a section of the aircraft's frame and release the parachute.

Figure 1:
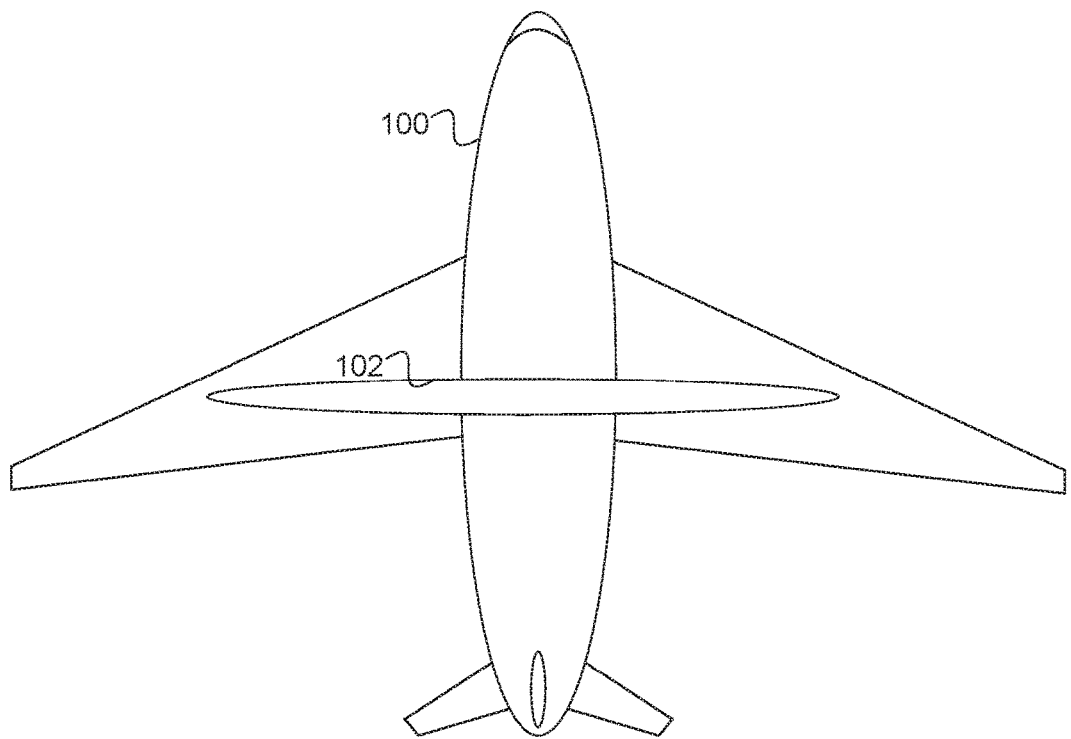
FIG. 1 is a diagram illustrating an embodiment of a distributed parachute system used in an aircraft.

FIG. 1 is a diagram illustrating an embodiment of a distributed parachute system used in an aircraft. In some embodiments, a distributed parachute that is stored entirely unpacked may result in the quickest deployment times. The aircraft may be large enough such that the parachute stored as a disc within the aircraft. The parachute may be deployed completely unpacked. However, aerodynamics of the aircraft and structural considerations may constrain the size of an aircraft. The parachute may be stored over a largest distributed area available. The parachute may be distributed as semi-deployed as possible across surfaces of the aircraft.

In the example shown, aircraft 100 comprises parachute 102. Parachute 102 as shown is stored across a fuselage and two wings of aircraft 100. Parachute 102 may be stored in a channel that travels across the wings and fuselage. In some embodiments, the channel is not level. The channel may be formed based on the aircraft configuration. The channel may follow the shape of the aircraft in order to be non-obstructive to aerodynamics of the aircraft. The channel may be recessed. In some embodiments, the channel is a depression within the frame of the aircraft. In some embodiments, the channel may be attached atop an aircraft component, such as a wing. The channel may be covered.

The parachute may be installed and stowed in accordance with aerodynamic, utility, or structural constrictions of the aircraft. For example, the parachute may be stored in a concave shape around the fuselage of aircraft 100. The parachute may be fully expanded horizontally as stored. Structural lines of the parachute may be stored distributed throughout the aircraft.

Figure 2A:
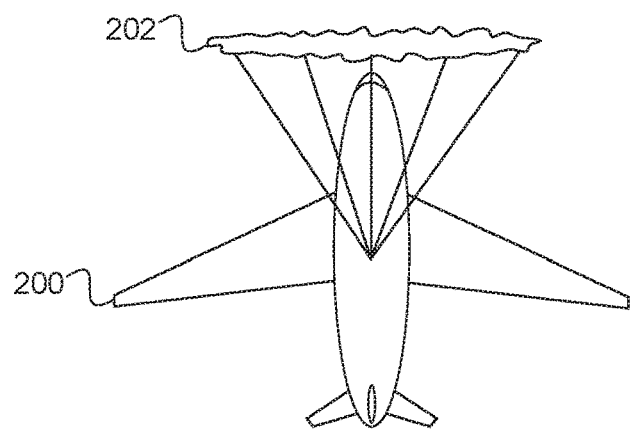
FIG. 2A is a diagram illustrating an embodiment of parachute deployment using a distributed parachute system.

FIG. 2A is a diagram illustrating an embodiment of parachute deployment using a distributed parachute system. In the example shown, parachute 202 is in initial stages of deployment from aircraft 200. Parachute 202 may show parachute 102 of FIG. 1A during initial deployment. Parachute 202 as shown is deployed in a slender, roll-like shape. The parachute may already be unpacked in the horizontal plane upon deployment, decreasing the amount of time until the parachute is fully unpacked. Decreasing a period of time until the parachute is fully filled may allow the parachute to more effectively slow down the aircraft before the aircraft crashes.

Figure 2B:
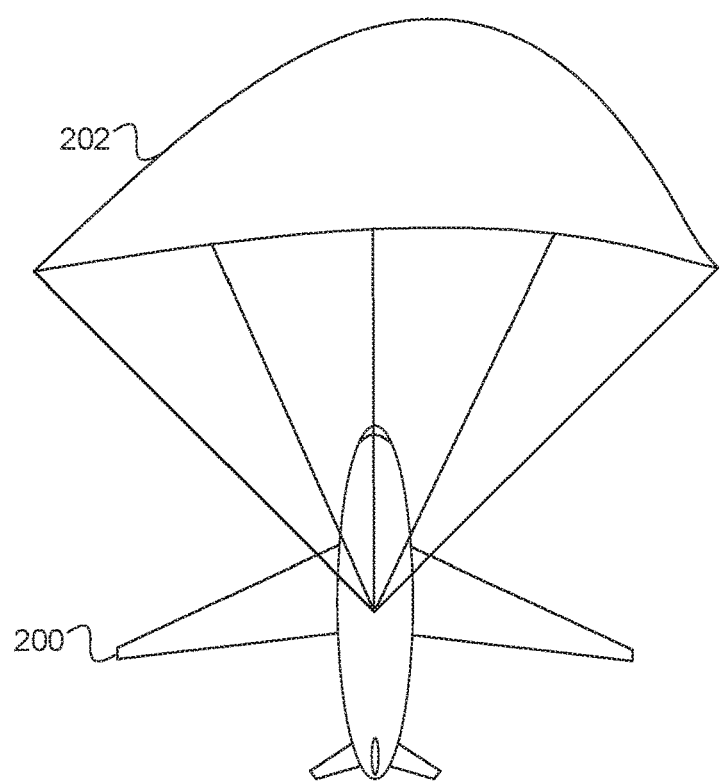
FIG. 2B is a diagram illustrating an embodiment of parachute deployment using a distributed parachute system.

FIG. 2B is a diagram illustrating an embodiment of parachute deployment using a distributed parachute system. FIG. 2B may show when the system after the parachute is deployed. In the example shown, parachute 202 is fully inflated. In some embodiments, one contiguous parachute is used. In some embodiments, multiple parachutes are used. The parachute may be attached to the aircraft using a bridle. The bridle may be attached to the aircraft at structurally sound points. The parachute may be deployed in relation to a center of gravity of the aircraft based on a desired landing position. The parachute may be deployed using reactive gas, compressed gas, mortars, ballistic projectiles, pneumatic mechanisms, or any appropriate method.

Figure 3A:
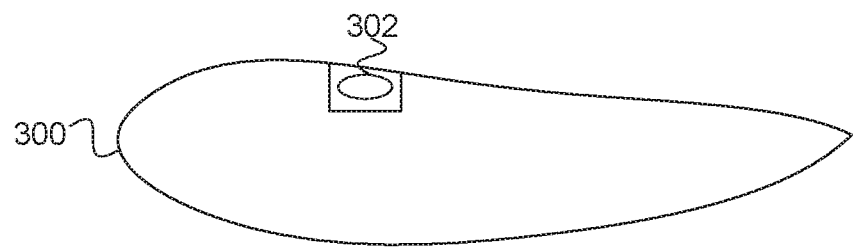
FIG. 3A is a diagram illustrating an embodiment of a packed parachute.

FIG. 3A is a diagram illustrating an embodiment of a packed parachute. The figure shows a cross section of aircraft component 300. Aircraft component 300 may comprise a fuselage, wing, or other part of an aircraft. As shown, parachute 302 is stored compactly in aircraft component 300. The parachute may be stored in a container.

Figure 3B:
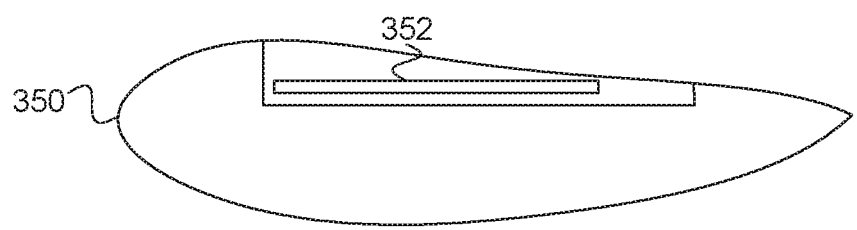
FIG. 3B is a diagram illustrating an embodiment of a distributed parachute.

FIG. 3B is a diagram illustrating an embodiment of a distributed parachute. The figure shows a cross section of aircraft component 352. In contrast to parachute 302 of FIG. 3A, parachute 352 is stored spread out over the aircraft component. Tethers of the parachute may be stored folded or tied to prevent tangling. The parachute as shown utilizes the length of aircraft component 350.

The distributed parachute may be stored in a container or bag that protects it from snagging on the aircraft. The parachute may be deployed inside the container initially before the container breaks off. For example, the container may be a sack that rips open. The container may fit around the distributed parachute throughout the aircraft. Parachute 352 may be stored in a compartment of aircraft component 350. The compartment may be isolated from the rest of the component to prevent the parachute from coming into contact with wiring, a flight computer, a structural frame, or any other appropriate part of the aircraft. The compartment may be outfitted with heat-insulating material. The compartment may comprise smooth surfaces. The compartment may be a rectangular prism.

Parachute 352 may be stored in a compartment or portion of aircraft component 350 that is configured to be removed without obstruction of the parachute in the event of deployment. In some embodiments, a portion of the aircraft directly covering the parachute is configured to be blasted through easily. The portion may be made with a weaker or thinner material. The aircraft may have include a panel that ejects when pressure exerted on it reaches a predetermined threshold. The panels may be attached with a weak adhesive. The panel may be hinged. The portion of the aircraft may be designed to be removed without comprising structural integrity of the rest of the aircraft or harming a human residing in the aircraft.

Figure 4A:
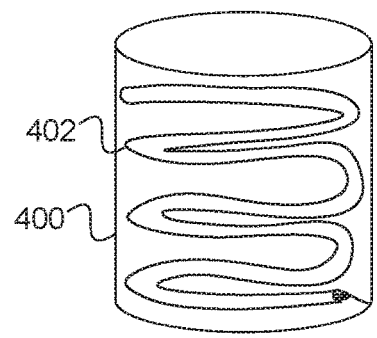
FIG. 4A is a diagram illustrating an embodiment of a packed parachute.

FIG. 4A is a diagram illustrating an embodiment of a packed parachute. The parachute shown may be used in traditional parachute deployment systems. Parachute 402 as shown is folded in on itself in container 400. The parachute may be rolled into a thin tube and the tube is then folded and packed. The tube may be stored in a coiled formation. Container 400 may be pressure packed.

Figure 4B:
FIG. 4B is a diagram illustrating an embodiment of a packed parachute during deployment.

FIG. 4B is a diagram illustrating an embodiment of a packed parachute during deployment. As shown, parachute 402 has been unpacked vertically. Unpacking the parachute in a vertical direction may take a significant portion of the deployment time. Deploying a traditionally packed parachute may comprise a step of unpacking the parachute in one dimension, wherein a distributed parachute is already stored mostly unpacked in one dimension.

Figure 4C:
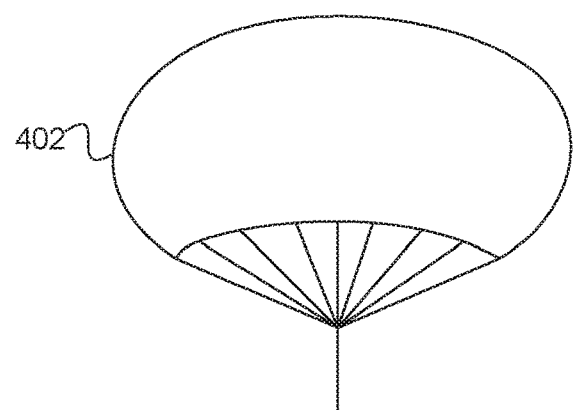
FIG. 4C is a diagram illustrating an embodiment of a packed parachute after deployment.

FIG. 4C is a diagram illustrating an embodiment of a packed parachute after deployment. In the example shown, parachute 402 has been filled. A total deployment time of a traditionally packed parachute may be significantly longer than that of a distributed parachute.

Figure 4D:
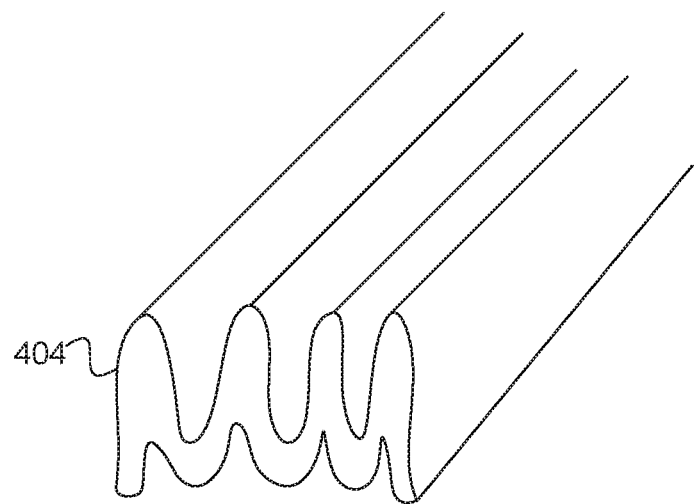
FIG. 4D is a diagram illustrating an embodiment of a cross section of a distributed parachute.

FIG. 4D is a diagram illustrating an embodiment of a cross section of a distributed parachute. In some embodiments, the parachute is stored fully unpacked in one dimension. The parachute may be folded or packed in another dimension in order to fit in an available storage space in the aircraft. As shown, parachute 404 is folded accordion-style. In some embodiments, the parachute is not be folded in a direction perpendicular to the accordion-style folds.

Figure 4E:
FIG. 4E is a diagram illustrating an embodiment of a distributed parachute.

FIG. 4E is a diagram illustrating an embodiment of a distributed parachute. In the example shown, parachute 450 is not packed in a horizontal direction. The parachute may be rolled, folded, scrunched, or packed in any appropriate manner. By storing the parachute unpacked or mostly unpacked in one dimension, the parachute may open faster than a traditionally packed parachute. Storing the parachute distributed throughout the aircraft may eliminate a deployment step required for traditionally packed parachutes shown in FIG. 4B.

Figure 4F:
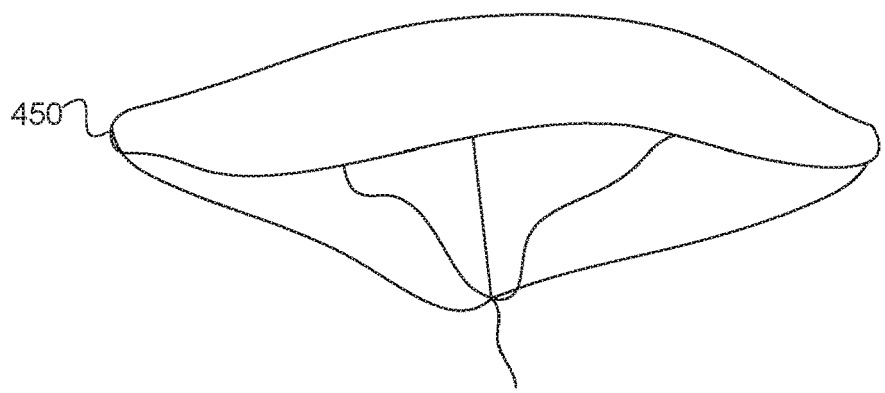
FIG. 4F is a diagram illustrating an embodiment of a distributed parachute during deployment.

FIG. 4F is a diagram illustrating an embodiment of a distributed parachute during deployment. In the example shown, parachute 450 has been deployed and is beginning to inflate. The air may begin to inflate the parachute from an oblong shape to a disc shape. Subsequently, the parachute may billow into its fully deployed shape.

Figure 4G:
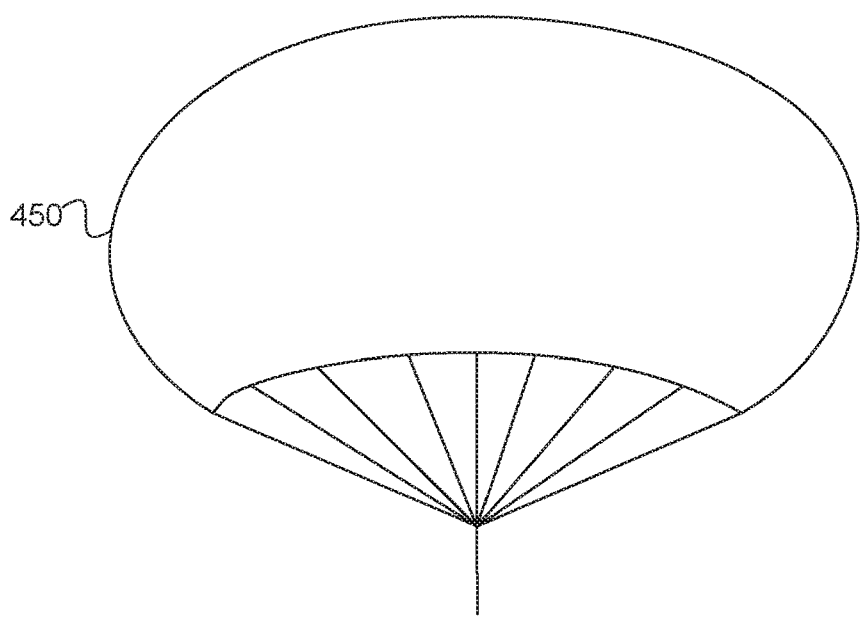
FIG. 4G is a diagram illustrating an embodiment of a distributed parachute after deployment.

FIG. 4G is a diagram illustrating an embodiment of a distributed parachute after deployment. In the example shown, parachute 450 is fully expanded. A parachute of a distributed parachute deployment system may reach full deployment quickly.

Figure 5A:
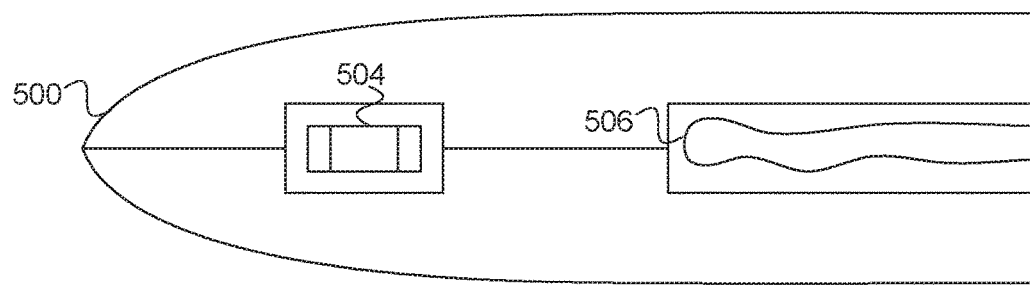
FIG. 5A is a diagram illustrating an embodiment of a separating mechanism of a distributed parachute system.

FIG. 5A is a diagram illustrating an embodiment of a separating mechanism of a distributed parachute system. A separating mechanism may be used to remove a portion of the aircraft in order to expose the parachute. The separating mechanism may include a projectile, an explosive, a reactive gas, a mechanical trigger, electrical trigger, or any other appropriate mechanism. The portion of the aircraft removed may vary based upon structural design of the aircraft. In some embodiments, the removed portion is a significant percentage of the aircraft. One half of large, dominating features of the aircraft may be removed. Aircraft components such as wings or fuselage may be constructed by molding two halves and joining them together. The parachute may be stored in between the two halves of the aircraft component. One half of the aircraft component may be blown away or removed during parachute deployment, revealing the parachute.

In the example shown, parachute 506 is stored throughout the length of wing 500. Near the tip of wing 500, explosive 504 is positioned in between two halves of wing 500. The two halves may be conjoined with adhesives. A seam may be present between the two halves. The two halves may separate at the seam when a predetermined threshold of pressure is exerted upon the halves. In the example shown, explosive 504 is stored in between the two halves of wing 500. The explosives may be triggered electronically or mechanically. The explosives may be controlled automatically based on flight conditions of the aircraft.

Figure 5B:
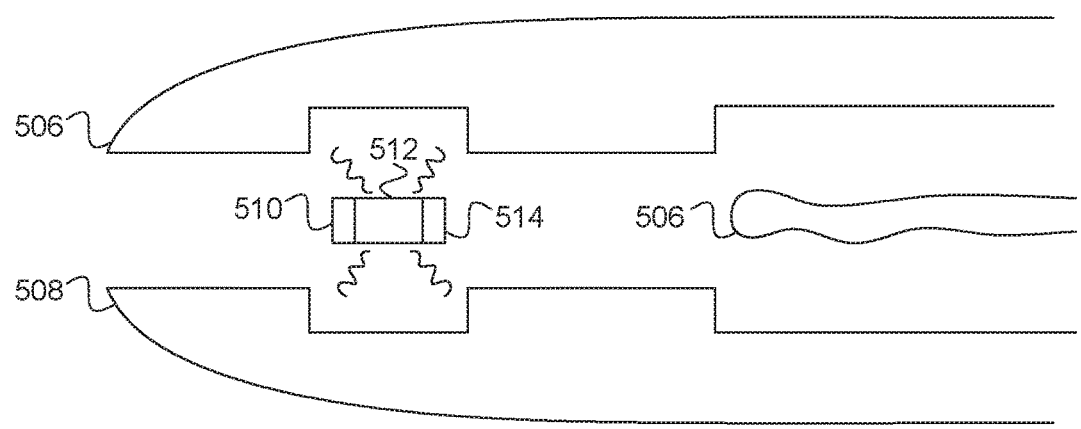
FIG. 5B is a diagram illustrating an embodiment of a separating mechanism of a distributed parachute system in use.

FIG. 5B is a diagram illustrating an embodiment of a separating mechanism of a distributed parachute system in use. In the example shown, explosive 512 has been triggered. In the example shown, two shielding components are positioned on either side of explosive 512. Shielding components 510 and 514 may prevent the explosive from exerting pressure to the left and right. They may constrain explosive 512's affect to upwards and downwards directions, causing the wing to split in halves into wing section 506 and wing section 508. Explosive 512 may be designed to prevent unplanned damage to the aircraft. For example, wing section 508's connection to a fuselage may be unaffected. In some embodiments, wing section 506 may be tethered to the fuselage or wing section 508 such that it hangs below the aircraft after being blown off. Discarded components may be tethered to a frame of the aircraft as to avoid causing harm as they fall to ground. Explosive 512 may be strong enough to completely blow wing section 506 away from atop wing section 508 quickly.

In some embodiments, a deployment aid is used to deploy parachute 506 away from the aircraft quickly once it is exposed. For example, a projectile may be used.

Figure 6:
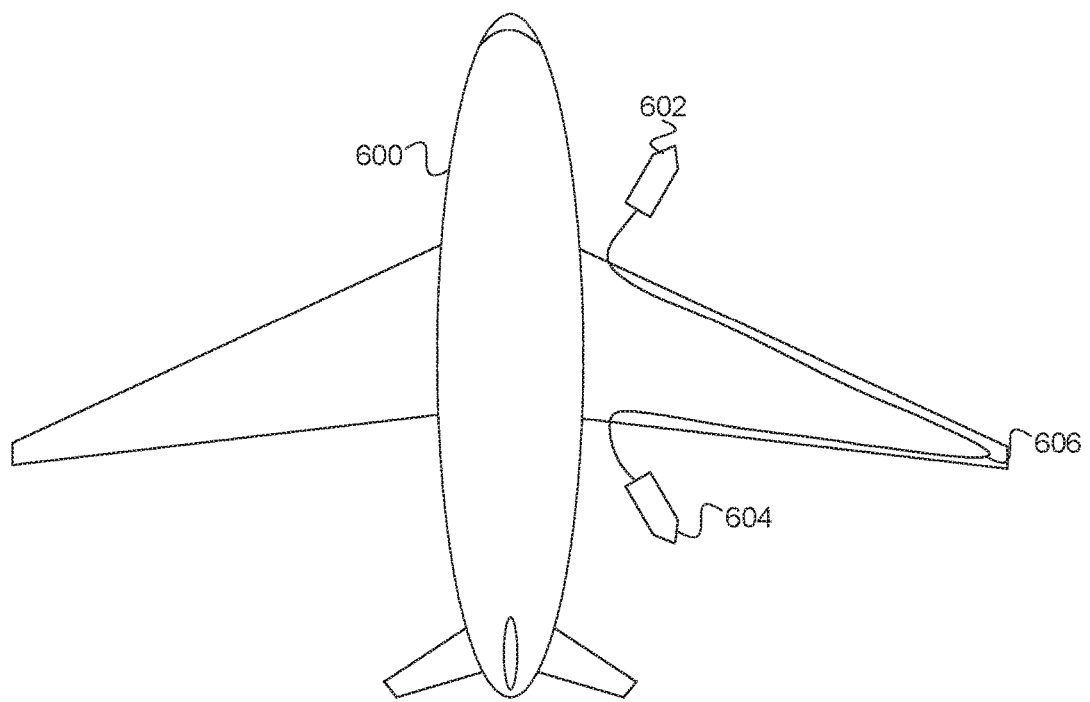
FIG. 6 is a diagram illustrating an embodiment of a distributed parachute system comprising self-propelled projectiles.

FIG. 6 is a diagram illustrating an embodiment of a distributed parachute system comprising self-propelled projectiles. Various methods may be used to remove portions of the aircraft during parachute deployment. In the example shown, tether 606 is strung along a perimeter of one wing of aircraft 600. One end of tether 606 is attached to rocket 602 and its other end is attached to rocket 604. Tether 606 may be in between a top and bottom section of the wing. During parachute deployment, the rockets may lift the top section of the wing off of aircraft 600. The rockets may fly away from aircraft 600 and carry the top section with them. The top section of the wing may be tethered to a fuselage of the aircraft and hang below the aircraft after being removed. A parachute may be stored in between the top section and bottom section of the wing. In some embodiments, a portion of the fuselage or tail is removed in order to expose the parachute.

Figure 7A:
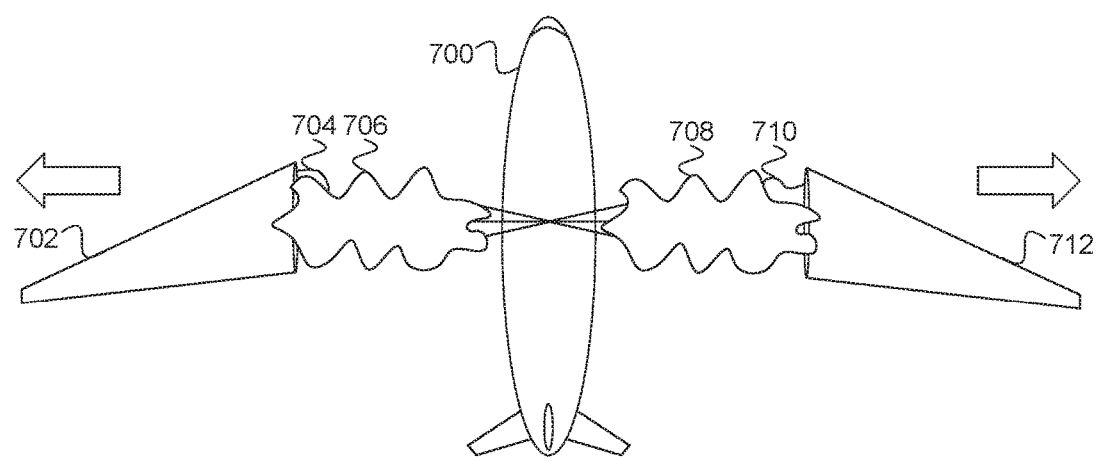
FIG. 7A is a diagram illustrating an embodiment of a distributed parachute system comprising fall-away wings.

FIG. 7A is a diagram illustrating an embodiment of a distributed parachute system comprising fall-away wings. In some embodiments, portions of the aircraft are sacrificial. They may be blown off or removed during parachute deployment. In the example shown, wings 702 and 712 break away from aircraft 700 during deployment. Parachutes 706 and 708 were stored distributed throughout wings 702 and 712 respectively. The wings may be detached using ballistic, explosive, or chemical methods. The wings may be blasted away from a fuselage of the aircraft. In the example shown, wing 702 is attached to parachute 706 via tether 704. Wing 712 is attached to parachute 708 via tether 710. Sacrificial elements of the aircraft may be attached to a parachute or the fuselage in order to prevent free fall and possible harm.

Figure 7B:
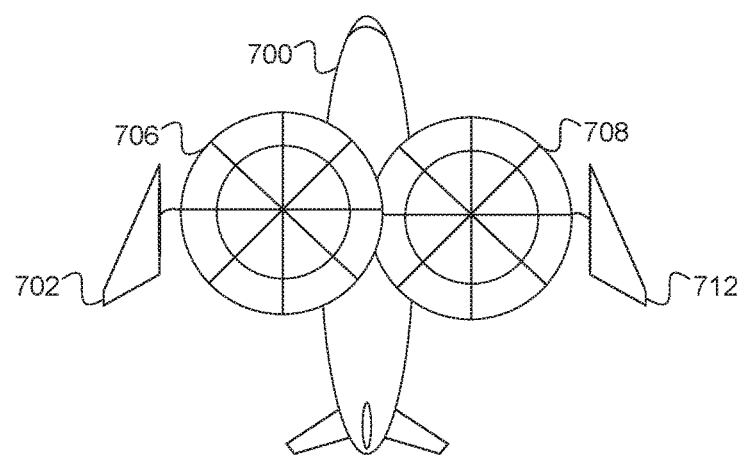
FIG. 7B is a diagram illustrating an embodiment of a distributed parachute system comprising fall-away wings.

FIG. 7B is a diagram illustrating an embodiment of a distributed parachute system comprising fall-away wings. In the example shown, parachutes 706 and 708 have fully expanded. The parachutes are attached to the fuselage of aircraft 700. The distributed parachute system may include multiple parachutes. The multiple parachutes may be attached to a shared point on the aircraft. They may bump against each other when they are fully deployed. In some embodiments, multiple parachutes are attached to different points on the aircraft. For example, a parachute may be stored in a tail of the aircraft and attached to the tail.

In the example shown, discarded wings 702 and 712 hang from parachutes 706 and 708. The wings may be composed of lightweight material. The wings may be hollow.

Figure 8:
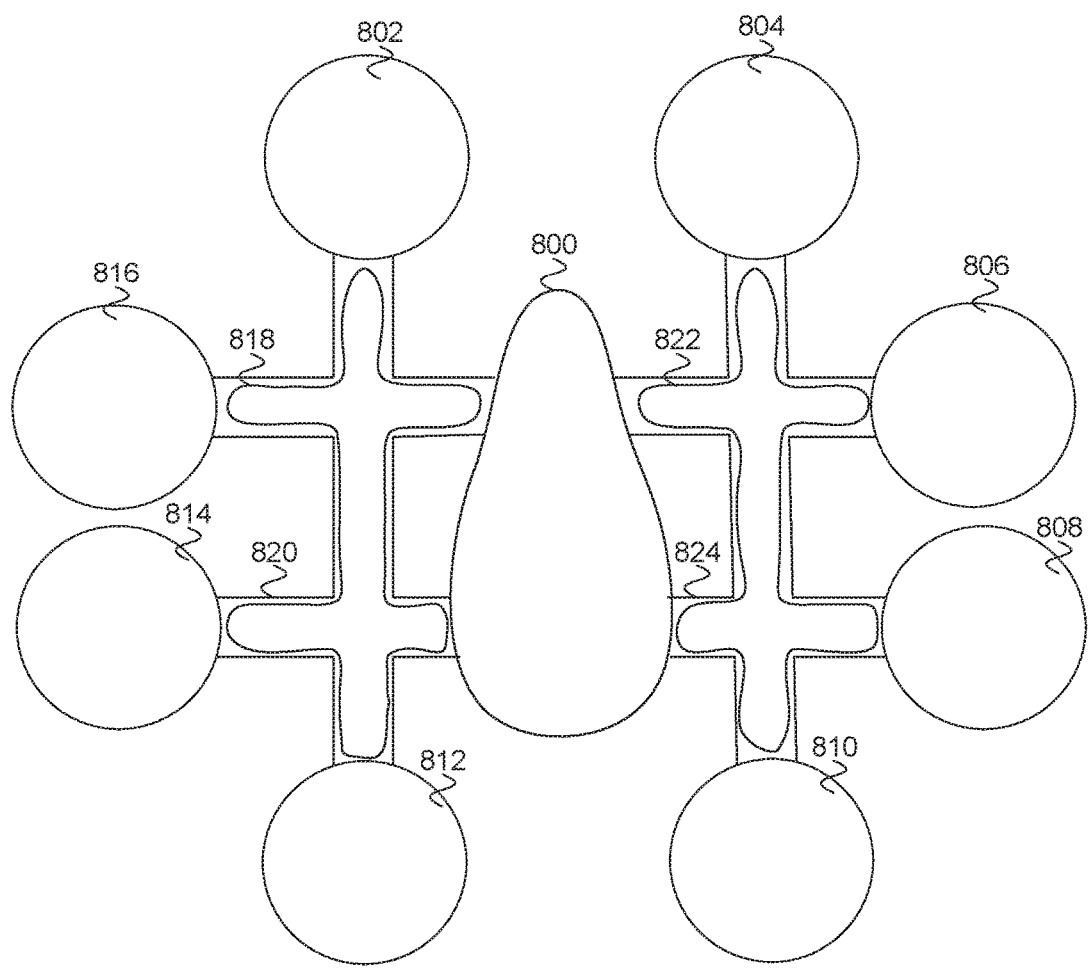
FIG. 8 is a diagram illustrating an embodiment of a distributed parachute system used in a multicopter.

FIG. 8 is a diagram illustrating an embodiment of a distributed parachute system used in a multicopter. A distributed parachute system may be used in aircraft of varying shapes, sizes, and configurations. In the example shown, multicopter 800 comprises eight rotors spaced around a fuselage. Rotors 802, 804, 806, 808, 810, 812, 814, and 816 are attached to the fuselage via a network of booms. To the left of the fuselage, parachute 818 is spread throughout boom section 820. Parachute 818 is distributed throughout an irregular shape to utilize the space available in boom section 820. The parachute may be stored as unpacked as possible based on aircraft constrictions. Parachute 822 is stored to the right of the fuselage in boom section 824.

Figure 9A:
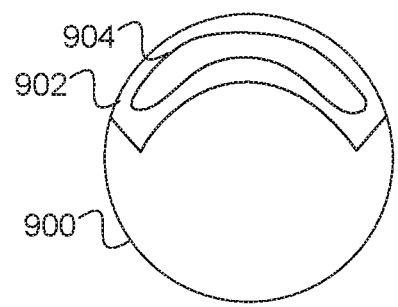
FIG. 9A is a diagram illustrating an embodiment of a distributed parachute stored in a boom.

FIG. 9A is a diagram illustrating an embodiment of a distributed parachute stored in a boom. The example shows a cross section of a boom. In the example shown, parachute 904 is stored within section 902 of boom 900. Section 902 follows the curve of boom 900 and is located at the top of the boom. The section confines the parachute to a small percentage of the boom. Section 902 may be configured to open when parachute 904 is deployed. The section may comprise hinges, a door, or a panel.

Figure 9B:
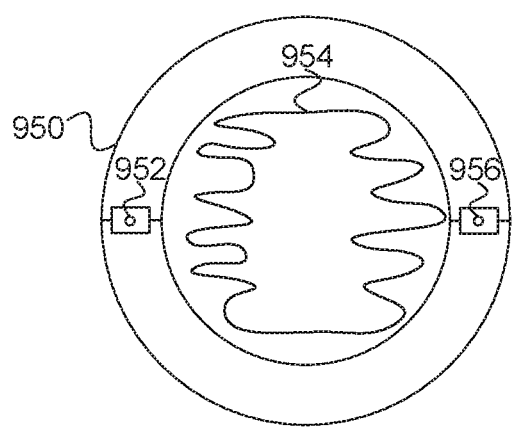
FIG. 9B is a diagram illustrating an embodiment of a distributed parachute stored in a boom.

FIG. 9B is a diagram illustrating an embodiment of a distributed parachute stored in a boom. In the example shown, the boom 950 is hollow. Parachute 954 is stored within boom 950. Explosives 952 and 956 are located halfway in between a top half and bottom half of the boom. Explosives 952 and 956 may be engaged to split boom 950 in half, revealing parachute 954. The bottom half of the boom may remain attached to a fuselage.

Figure 10:
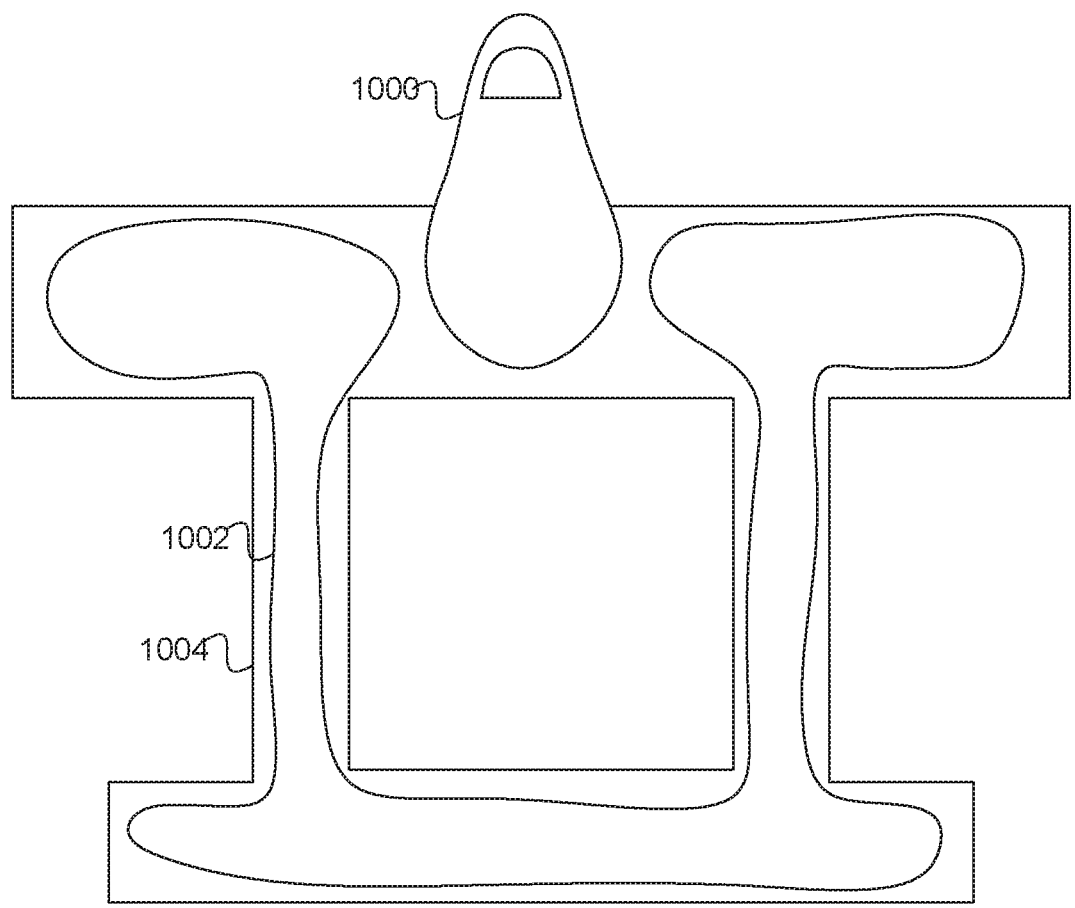
FIG. 10 is a diagram illustrating an embodiment of distributed parachute system used in an aircraft.

FIG. 10 is a diagram illustrating an embodiment of distributed parachute system used in an aircraft. The aircraft shown has an unconventional shape. Fuselage 1000 is pear-shaped and is positioned in the front of the aircraft. Main aircraft frame 1004 is roughly rectangular in shape and has a large hollow in the middle of the frame. Parachute 1002 as shown is distributed throughout the irregularly shaped frame. The parachute snakes around the crevices of the frame. A distributed parachute system may take advantage of vastly differing aircraft frames.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A distributed parachute system, comprising: a parachute at least partially deployed along one or more dimensions, and a deployment mechanism configured to deploy the parachute, wherein the distributed parachute system is configured to be deployed in an aircraft that comprises a channel oriented along the one or more dimensions, wherein a tether around a perimeter of a wing of the aircraft in between a top section and a bottom section of the wing is attached to a projectile configured to remove the top section of the wing.

2. The system of claim 1, wherein the channel is recessed.

3. The system of claim 1, wherein the parachute is fully unpacked in one dimension.

4. The system of claim 1, wherein the parachute is fully unpacked in one dimension and is folded in a perpendicular dimension.

5. The system of claim 1, wherein the parachute is stored in an oblong shape.

6. The system of claim 1, wherein the parachute is stored in an irregular shape based on the aircraft.

7. The system of claim 1, comprising one or more additional parachutes stored in the channel or stored in one or more additional channels.

8. The system of claim 1, wherein a portion of the aircraft positioned over the parachute is removed during parachute deployment.

9. The system of claim 8, wherein the portion of the aircraft comprises a hinge, a panel, an adhesive, or a structurally weak material.

10. The system of claim 8, wherein the portion of the aircraft is tethered to a remaining portion of the aircraft or the parachute.

11. The system of claim 1, wherein a separating mechanism is used to remove a portion of the aircraft during parachute deployment.

12. The system of claim 11, wherein the separating mechanism comprises a projectile, an explosive, a reactive gas, a mechanical trigger, or an electrical trigger.

13. The system of claim 1, wherein the channel comprises a hollow between a top section and a bottom section of a component of the aircraft.

14. The system of claim 1, wherein an explosive is used to blow off a top section of a component of the aircraft during parachute deployment.

15. The system of claim 1, wherein the parachute is stored within a wing of the aircraft and the wing is configured to travel away from a fuselage of the aircraft during parachute deployment.

16. The system of claim 1, wherein the parachute is stored in a boom of the aircraft.

17. The system of claim 1, comprising multiple parachutes that tethered to the aircraft at a shared location.

18. The system of claim 1, comprising multiple parachutes that tethered to the aircraft at different locations.

* * * * *